US012518846B2

(12) United States Patent
Injarapu et al.

(10) Patent No.: US 12,518,846 B2
(45) Date of Patent: Jan. 6, 2026

(54) SYSTEMS AND METHODS FOR TESTING ERROR CORRECTION CODE (ECC) LOGIC OF AUTOMOTIVE SAFETY SYSTEMS FOR FAULTS

(71) Applicant: QUALCOMM INCORPORATED, San Diego, CA (US)

(72) Inventors: Sateeshkumar Injarapu, Bangalore (IN); Amit Duggal, Bangalore (IN); Manish Kumar Saxena, Bangalore (IN); Nitin Jaiswal, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 18/338,635

(22) Filed: Jun. 21, 2023

(65) Prior Publication Data
US 2024/0428876 A1 Dec. 26, 2024

(51) Int. Cl.
| | | |
|---|---|---|
| *G11C 29/42* | (2006.01) | |
| *G06F 11/10* | (2006.01) | |
| *G06F 11/22* | (2006.01) | |
| *G11C 29/02* | (2006.01) | |
| *G11C 29/10* | (2006.01) | |
| *G11C 29/36* | (2006.01) | |

(52) U.S. Cl.
CPC .......... *G11C 29/42* (2013.01); *G06F 11/1048* (2013.01); *G06F 11/2215* (2013.01); *G11C 29/02* (2013.01); *G11C 29/10* (2013.01); *G11C 29/36* (2013.01); *G11C 2029/3602* (2013.01)

(58) Field of Classification Search
CPC ......... G11C 29/42; G11C 29/02; G11C 29/10; G11C 29/36; G11C 2029/3602; G06F 11/1048; G06F 11/2215

USPC ....... 714/703, 719, 718, 723, 763, 766, 768, 714/773, 799, 819
See application file for complete search history.

(56) References Cited

U.S. PATENT DOCUMENTS

| | | | | |
|---|---|---|---|---|
| 10,625,752 | B2* | 4/2020 | Kakoee | B60W 50/0205 |
| 11,335,428 | B2* | 5/2022 | Azam | G11C 29/36 |
| 12,235,720 | B2* | 2/2025 | Agarwal | G11C 29/36 |
| 2016/0292059 | A1* | 10/2016 | Catherwood | G06F 11/263 |
| 2018/0331692 | A1* | 11/2018 | Gulati | H03M 13/015 |
| 2019/0051370 | A1* | 2/2019 | Azam | G11C 29/36 |
| 2019/0176838 | A1* | 6/2019 | Kakoee | B60W 50/0205 |
| 2024/0061741 | A1* | 2/2024 | Agarwal | G11C 29/10 |
| 2024/0221854 | A1* | 7/2024 | Chavali | G11C 29/36 |
| 2024/0428876 | A1* | 12/2024 | Injarapu | G11C 29/36 |

OTHER PUBLICATIONS

Veetil et al., Comprehensive In-field Memory Self-Test and ECC Self-Checker—Minimal Hardware Solution for FuSa, 2021, IEEE, pp. 1-6. (Year: 2021).*
International Search Report and Written Opinion—PCT/US2024/030765—ISA/EPO—Aug. 19, 2024.

* cited by examiner

*Primary Examiner* — John J Tabone, Jr.
(74) *Attorney, Agent, or Firm* — Smith Tempel Blaha LLC

(57) ABSTRACT

An error correction code (ECC) test system and method are provided that test ECC logic for faults, preferably at power on before a workload is being processed. If the ECC logic fails the test, preferably an interrupt is issued indicating that the ECC logic is faulty and the corresponding ECC fault signature is reported in a status register of the system as part of a consolidated system report.

30 Claims, 7 Drawing Sheets

SYSTEMS AND METHODS FOR TESTING ERROR CORRECTION CODE (ECC) LOGIC OF AUTOMOTIVE SAFETY SYSTEMS FOR FAULTS

DESCRIPTION OF THE RELATED ART

Computing devices and their components may experience operational failures, possibly leading to undesirable outcomes. In some types of computing devices, such as safety-critical systems used in vehicle automated driving systems, an unexpected failure may lead to conditions dangerous to drivers and others. One of the key underpinnings of an automated driving system is its ability to continue to stay operational while electrical/electronic (E/E) faults or other failures in software have been detected by the Advanced Driver Assistance System (ADAS) or automated driving system (ADS). The electronic control unit (ECU) is the heart of ADAS/ADS systems and fuses together large amounts of information about the surrounding environment acquired from various sensors, such as stereo cameras, radar, and other sensors to perform a complex and computationally intense problem that is critical to ensuring the availability of the system while continuously detecting and managing faults during mission mode.

Error correction coding (ECC) is widely used as a safety mechanism for detecting and correcting bit faults in memories of ADAS/ADS systems. ECC syndrome generation and checking is performed by a digital test logic that can be susceptible to random faults. If any such random fault (permanent or transient) occurs in that logic, it might create a false memory fault or it might miss an actual memory fault. This may lead to a system failure if the fault occurs during mission mode, which is highly undesirable in safety-critical systems such as vehicle automated driving systems.

There is a need to detect any fault in this digital test logic before the system executes the actual workload, i.e., during the power-on time.

SUMMARY OF THE DISCLOSURE

Systems, methods, and other examples are disclosed for testing ECC logic that is used to detect bit errors in memory devices. A representative embodiment of the ECC test system comprises fault injection logic and fault decision logic. The fault injection logic is configured to inject a first preselected test bit pattern into the ECC logic for processing by the ECC syndrome generator logic to generate a first ECC syndrome that is stored in a first ECC memory of the first memory device. The fault injection logic is further configured to retrieve the first ECC syndrome from the first ECC memory, alter the retrieved first ECC syndrome in a predetermined manner and cause the altered first ECC syndrome to be processed by the ECC checker logic to generate a first fault signature that is logged by an ECC logger. The fault decision logic is configured to receive the logged first fault signature from the ECC logger and to compare the logged first fault signature with an expected fault signature to determine whether the logged first fault signature matches the expected fault signature.

A representative embodiment of the method comprises:
using fault injection logic to cause a first preselected test bit pattern to be injected into the ECC logic and sent to ECC syndrome generator logic of the ECC logic, the ECC syndrome generator logic processing the injected first preselected test bit pattern to generate a first ECC syndrome that is stored in a first ECC memory of the first memory device;
using the fault injection logic to retrieve the first ECC syndrome from the first ECC memory, alter the first ECC syndrome in a predetermined manner and send the altered first ECC syndrome to the ECC checker logic, the ECC checker logic receiving the altered first ECC syndrome and processing the altered first ECC syndrome to generate a first fault signature that is logged by an ECC logger; and
using fault decision logic to compare the logged first fault signature with an expected fault signature to determine whether the logged first fault signature matches the expected fault signature.

A representative embodiment of a computer program for testing ECC logic comprises first, second, third and fourth sets of computer instructions embodied on a non-transitory computer readable medium. The first set of computer instructions causes fault injection logic to inject a first preselected test bit pattern into the ECC logic. The second set of computer instructions causes the fault injection logic to send the first preselected test bit pattern to ECC syndrome generator logic of the ECC logic, which processes the first preselected test bit pattern to generate a first ECC syndrome that is stored in a first ECC memory of the first memory device. The third set of computer instructions causes the fault injection logic to retrieve the first ECC syndrome from the first ECC memory, alter the first ECC syndrome in a predetermined manner and send the altered first ECC syndrome to ECC checker logic, which processes the altered first ECC syndrome to generate a first fault signature that is logged by an ECC logger. The fourth set of computer instructions causes fault decision logic to compare the logged first fault signature with an expected fault signature to determine whether the logged first fault signature matches the expected fault signature.

Another representative embodiment of the ECC test system comprises:
means for injecting a preselected test bit pattern into the ECC logic for processing by the ECC syndrome generator logic to generate an ECC syndrome that is stored in a first ECC memory of the first memory device;
means for retrieving the ECC syndrome from the first ECC memory;
means for altering the retrieved ECC syndrome in a predetermined manner;
means for causing the altered ECC syndrome to be sent to the ECC checker logic for processing by the ECC checker logic to generate a fault signature that is logged by an ECC logger; and
means for receiving the logged fault signature from the ECC logger and for comparing the logged fault signature with an expected fault signature to determine whether the logged fault signature matches the expected fault signature.

These and other features and advantages will become apparent from the following description, drawings and claims.

BRIEF DESCRIPTION OF THE DRAWINGS

In the Figures, like reference numerals refer to like parts throughout the various views unless otherwise indicated. For reference numerals with letter character designations such as "101a" or "101b", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Figure 1:
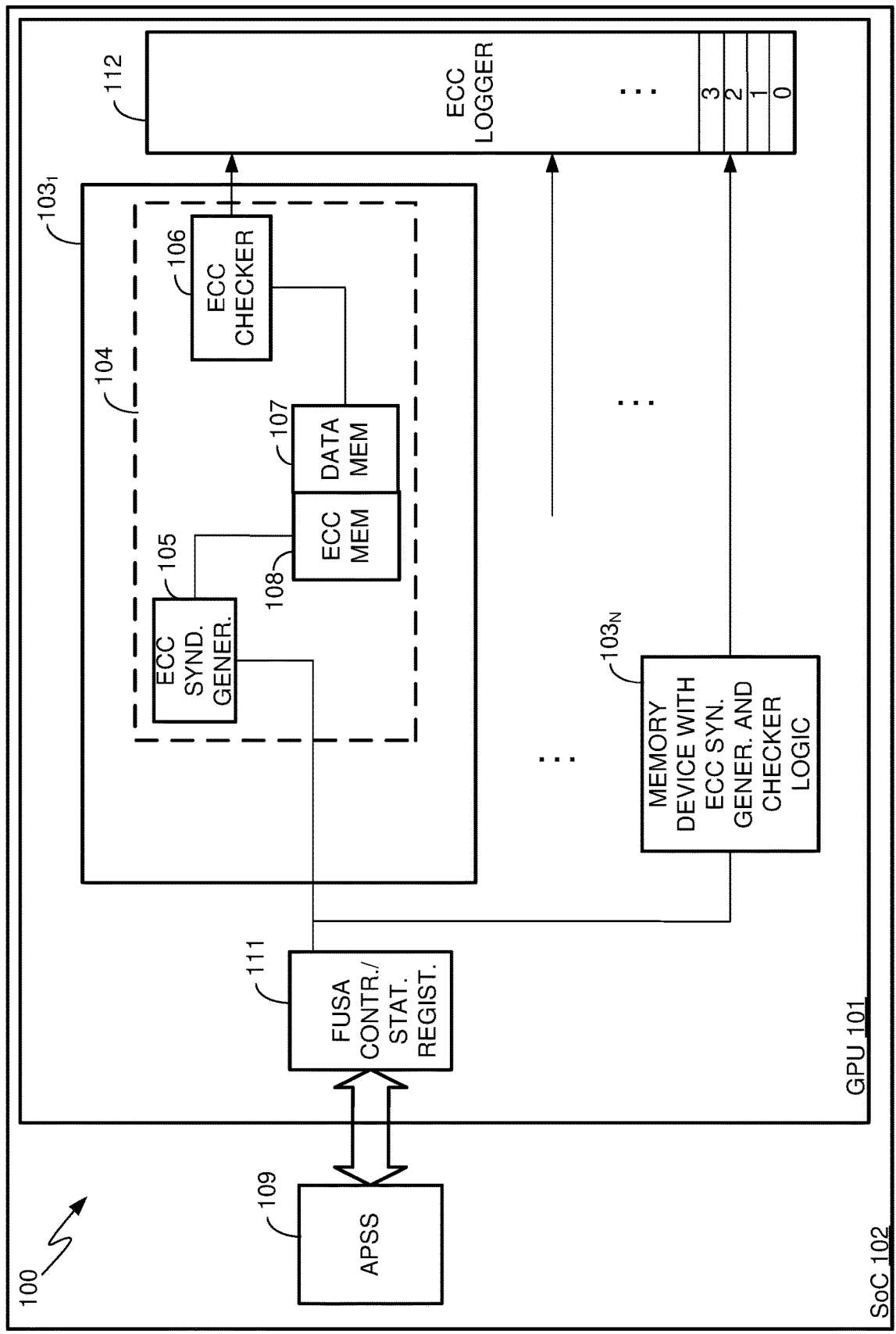
FIG. 1 illustrates a block diagram of an example of an ADAS/ADS system comprising ECC logic for performing ECC syndrome generation and checking.

As indicated above, ECC syndrome generation and checking is used for detecting and correcting bit faults in memory devices of ADAS/ADS systems. ECC syndrome generation and checking is performed by ECC checker logic that can be susceptible to random faults. If any such random fault (permanent or transient) occurs in that logic, it can create a false memory fault or miss an actual memory fault. This may lead to a system failure if the fault occurs during mission mode, which is highly undesirable in safety-critical systems such as vehicle automated driving systems.

In accordance with inventive principles and concepts of the present disclosure, a test system and method are provided that test the ECC checker logic for faults, preferably at power on before a workload is being processed. If the ECC checker logic fails the test, preferably an interrupt signal is generated indicating to the system that the ECC checker logic is faulty and the corresponding ECC fault signature is reported in a status register of the system as part of a consolidated system report.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The word "representative" may be used herein synonymously with "exemplary." Any aspect described herein as "exemplary" is not necessarily to be construed as preferred or advantageous over other aspects. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or more memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a system comprising "a processor" should be interpreted as one or more processors. The processor may for instance be a multi-core processor comprising multiple processing cores, each may comprise multiple processing stages of a processing pipeline. A processor may also refer to a collection of processors within a single computer system or distributed amongst multiple computer systems.

A computing device may include multiple subsystems, cores or other components. Such a computing device may be, for example, a PCD, such as a laptop or palmtop computer, a cellular telephone or smartphone, a portable digital assistant, a portable game console, an automotive safety system of an autonomous driving vehicle, a server chip, etc.

FIG. 1 illustrates a block diagram of an example of an ADAS/ADS system 100 comprising ECC logic for performing ECC syndrome generation and checking. In the example shown in FIG. 1, the system 100 does not include the ECC testing logic of the present disclosure. FIG. 1 will be described to demonstrate an example of the manner in which current ECC logic performs ECC syndrome generation and checking. In this exemplary system 100, the ECC logic is implemented in a graphics processing unit (GPU) 101 of an SoC 102. The ECC logic 104 is integrated into each of the memory devices $103_1$-$103_N$ of the GPU 101, where N is a positive integer that is greater than or equal to one. The ECC logic 104 comprises ECC syndrome generation logic 105 and ECC checker logic 106. Each memory address in each of the memory devices $103_1$-$103_N$ includes data memory 107 and ECC memory 108 that are collocated, or contiguous with one another. A single data memory 107 and associated ECC memory 108 are shown in FIG. 1 for ease of illustration.

An application processor subsystem (APSS) 109 of the system 100 communicates with functional safety control and status register logic (FuSA logic) 111 that is configured to operate in accordance with the International Organization For Standardization (ISO) 26262 standard. The FuSa logic 111 is configured to initiate an ECC test by asserting one or more bits of a register of the FUSA logic 111 to cause the FUSA logic 111 to generate a write-enable signal, a write-address signal, and a write-data signal to cause data to be written to a particular address in one of the memory devices $103_1$-$103_N$. This causes an ECC syndrome to be generated by the ECC syndrome generation logic 105 and written to the ECC memory 108. The data is written to the data memory 107. The ECC syndrome generation logic 105 processes the data bits in accordance with a predefined ECC algorithm to generate the ECC syndrome, or code, which it then stores in the ECC memory 108.

The FUSA logic 111 then generates a read-enable signal for the same address in the same memory device $103_1$-$103_N$ that was just written. The ECC checker logic 106 reads the data and the ECC syndrome from the data and ECC memory 107 and 108, respectively. The ECC checker logic 106 processes the data bits in accordance with the same predefined ECC algorithm that was used by the ECC syndrome generation logic 105 to generate the ECC syndrome, which it then compares to the ECC syndrome read from the ECC memory 108 to determine whether they match. If they do not match, this is an indication that the data read from the memory location has one or more bit errors, in which case the ECC checker logic 106 logs an association between the error and the memory location at which the error occurred in an ECC logger 112. This logged information is accessible by the system 100 and can be used by the system 100 as a safety mechanism for detecting and correcting bit errors in the data read from the memory devices $103_1$-$103_N$.

In the example of the ECC logic and method described above with reference to FIG. 1, the data memory 107 and the ECC memory 108 are configured for in-line ECC, meaning that the data memory 107 and the ECC memory 108 are collocated in the same memory device. In other words, the actual data and the associated ECC code are stored together in a block of contiguous memory. Side-band ECC configurations can also be used in which the actual data and the ECC codes are stored in different memory devices. The inventive principles and concepts of the present disclosure are applicable to both types of configurations. For ease of discussion and illustration, it will be assumed herein that the inventive principles and concepts for testing ECC logic are applied to an in-line ECC logic configuration, although the inventive principles and concepts apply equally to side-band ECC configurations.

As indicated above, a need exists for systems and methods for testing ECC logic to determine whether or not it is operating properly. Exemplary, or representative, embodiments will now be described with reference to FIGS. 2-7 of systems and methods for testing ECC logic, such as ECC logic 104 shown in FIG. 1, for example.

Figure 2:
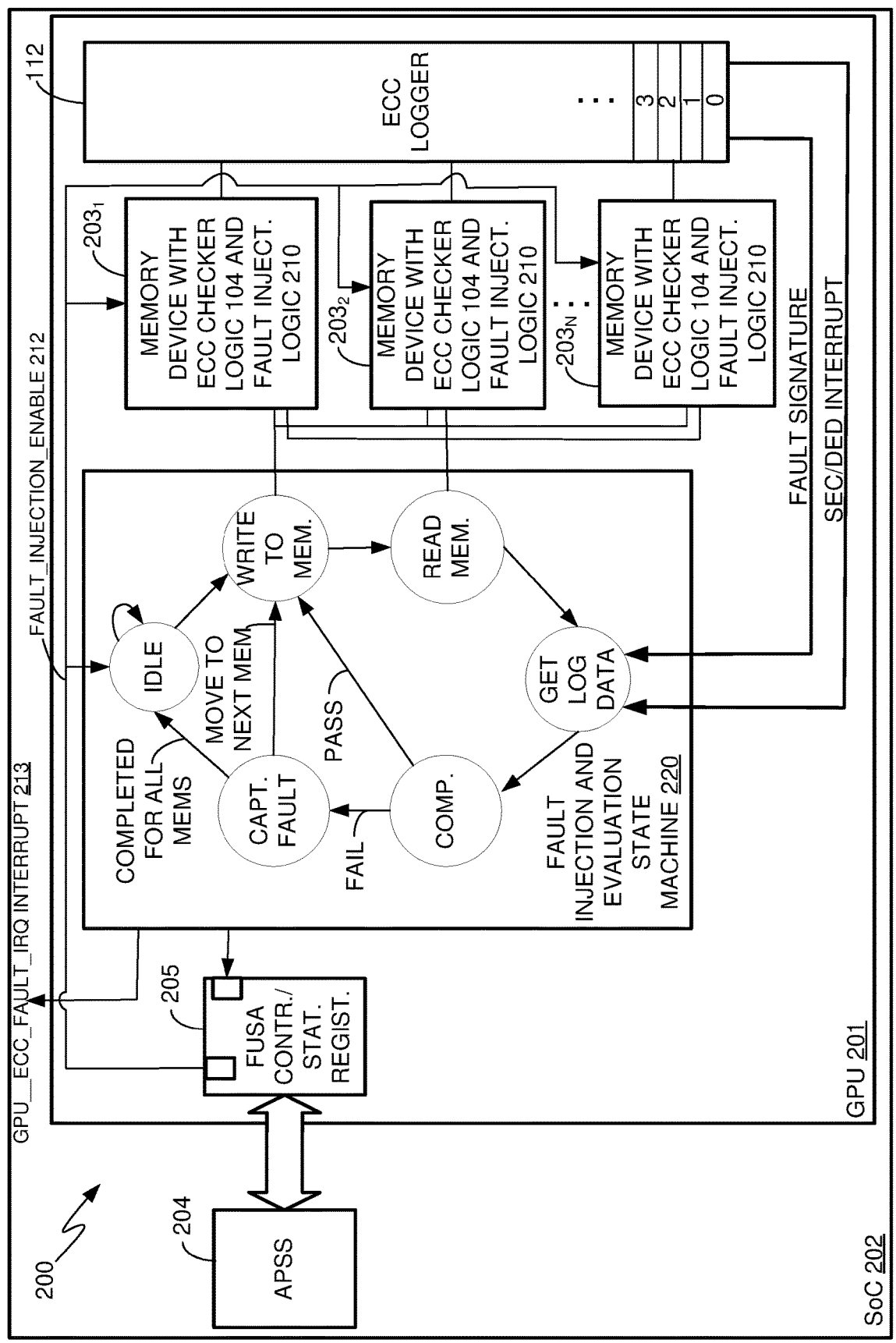
FIG. 2 illustrates a block diagram of a system in accordance with an exemplary embodiment for testing ECC logic that is used to detect bit errors in memory devices.

FIG. 2 illustrates a block diagram of the system 200 in accordance with an exemplary embodiment for testing ECC logic. For ease of illustration and discussion, it will be assumed that the system 200 is used to test the ECC logic 104 shown in FIG. 1, although the inventive principles and concepts are not limited to testing this particular ECC logic configuration. In accordance with this exemplary embodiment, the system 200 is implemented in a GPU 201 of an SoC 202. It should be noted, however, that the system 200 can be implemented in any processor or in any system that uses memory that stores bits that can become faulty or corrupted, such as a central processing unit (CPU), a neural processing unit (NPU), a digital signal processor (DSP), etc.

In accordance with this embodiment, the ECC test system of the present disclosure comprises fault injection logic 210 that is integrated with the ECC logic 104 in each of the memory devices $203_1$-$203_N$ of the GPU 201 and a fault injection and evaluation state machine 220 that is external to the memory devices $203_1$-$203_N$. As will be described below in detail with reference to FIG. 3, the fault injection logic 210 and the ECC logic 104 can be integrated into memory wrappers of the memory devices $203_1$-$203_N$. A memory wrapper, as that term is used herein, denotes a portion of the memory banks of each memory device $203_1$-$203_N$ in which the fault injection logic 210 and the ECC checker logic 104 are integrated.

In accordance with this embodiment, an APSS 204 of the system 200 is configured to communicate with FuSA logic 205 that is configured to operate in accordance with ISO 26262, although the inventive principles and concepts of the present disclosure are not limited to the system 200 being in compliance with ISO 26262 or any other standards. Preferably the FuSa logic 205 is configured by the APSS 204 to cause the ECC test system comprising logic 210 and state machine 220 of the present disclosure to perform a test of the ECC logic 104 at run-time before a workload is being performed.

In accordance with a representative embodiment, the APSS 204 initiates the test by asserting one or more bits of a register of the FuSa logic 205 to cause a Fault_Injection_Enable signal 212 to be asserted. The asserted Fault_Injection_Enable signal 212 is received by the ECC logic 104, by the injection logic 210 and by the state machine 220. At power up, the state machine 220 enters an IDLE state and remains in the IDLE state until it receives the asserted Fault_Injection_Enable signal 212 from the FuSa logic 205. Receipt of the asserted Fault_Injection_Enable signal by the state machine 220 causes it to enter a WRITE TO MEMORY state. In this state, the state machine 220 generates a write-enable signal, a write-address signal, and a write-data signal to write, or inject, a preselected test bit pattern to a particular address in one of the memory devices $203_1$-$203_N$. As described above with reference to FIG. 1, this causes the ECC syndrome generation logic 105 (FIG. 1) of the ECC logic 104 to process the preselected test bit pattern to generate an ECC syndrome that is then written to the ECC memory 108 (FIG. 1) of the ECC logic 104 at the particular memory address. This also causes the preselected test bit pattern to be written to the data memory 107 (FIG. 1) of the ECC logic 104 at the particular memory address.

The state machine 220 then enters a GENERATE READ state in which it generates a read-enable signal for the same address in the same memory device $203_1$-$203_N$ that was just written. The fault injection logic 210 of the present disclosure includes alteration logic that alters the test bit pattern read out of data memory 107 in a predetermined manner to mimic a fault. The ECC checker logic 106 (FIG. 1) of the ECC logic 104 then processes the altered test bit pattern to generate the ECC code, compares it to the ECC code read from ECC memory 108, and outputs a fault signature, which is logged in the ECC logger 112.

The state machine 220 then enters a GET LOG DATA state in which it obtains the fault signature from the ECC logger 112. An interrupt is issued by the ECC logger 112 when it logs the fault signature that causes the state machine 220 to obtain the logged fault signature, exit the GET LOG DATA state and enter a COMPARE state in which it compares the logged fault signature with an expected fault signature. The state machine 220 is preconfigured with intelligence that informs it of the expected fault signature. If the logged fault signature matches the expected fault signature, the state machine 220 re-enters the WRITE TO MEMORY state and writes to the next address in memory, reads the memory address in the READ MEMORY state, obtains the corresponding logged fault signature in the GET LOG DATA state and compares it to the expected fault signature in the COMPARE state. The process repeats until all addresses in all of the memory device $203_1$-$203_N$ have been written, read and checked. If no faults are detected at the COMPARE state at the end of the entire process, this informs the system 200 that the ECC logic 104 is working properly.

If a determination is made by the state machine 220 in the COMPARE state that the logged fault signature does not match the expected fault signature, the state machine 220 enters a Capture Fault state in which it adds the erroneous fault signature to an ECC fault signature register of the FuSa logic 205, issues a GPU_ECC_Fault_IRQ interrupt signal 213 that indicates to the system 200, and possibly to systems external to the system 200, that the ECC logic 104 of the particular memory device $203_1$-$203_N$ is not operating properly, and then clears the interrupt that was just issued. The state machine 220 then re-enters the WRITE TO MEMORY state and the process repeats until all addresses in all of the memory devices $203_1$-$203_N$ have been written, read and checked.

Figure 3:
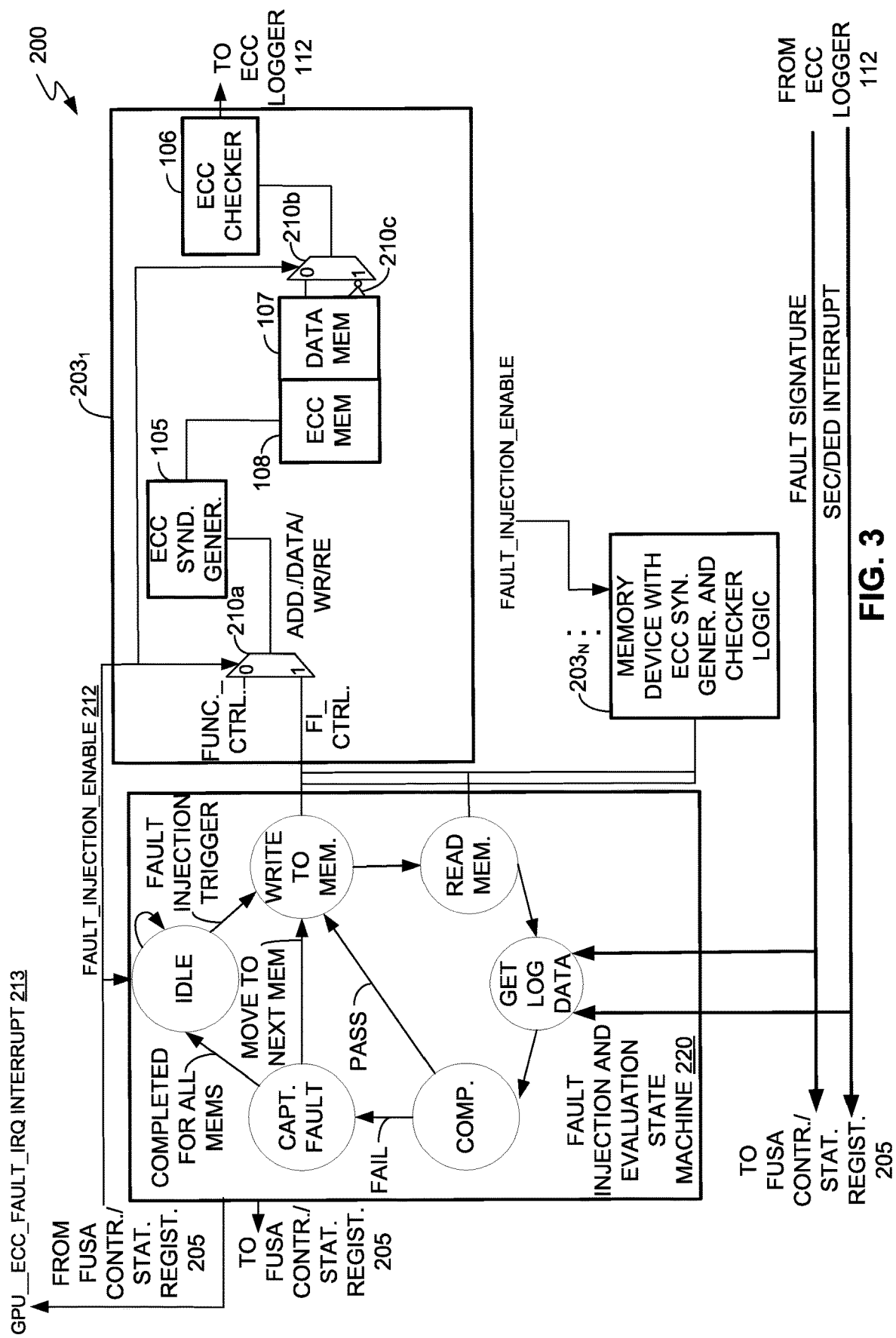
FIG. 3 illustrates a block diagram of the fault injection state machine of the system shown in FIG. 2 showing a representative embodiment of the ECC syndrome generation logic and ECC checker logic having the ECC testing logic of the present disclosure integrated therewith for testing the ECC checker logic.

FIG. 3 illustrates a block diagram of the system 200 shown in FIG. 2 in accordance with a representative embodiment in which the fault injection logic 210 comprises selection logic 210a, 210b, portions of the state machine 220 that control the selection logic 210a, 210b, and bit alteration logic 210c. In accordance with this representative embodiment, the selection logic 210a and 210b comprises the first and second multiplexers (MUXes), respectively, and the bit alteration logic 210c comprises an inverter. For exemplary purposes, the ECC logic 105-108 shown in FIG. 1 is shown in FIG. 3, although it will be understood that the inventive principles and concepts are not limited to testing ECC logic having this particular ECC logic configuration.

When the Fault_Injection_Enable signal 212 output by the FuSa logic 205 remains unasserted, the MUX 210a selects the logic 0 input, FUNC_CTRL, as the output of the MUX 210a. This ensures that the ECC syndrome generator and checker logic 105 and 106, respectively, operate in the normal manner described above with reference to FIG. 1 to check the data bits stored in the memory banks of the memory devices $203_1$-$203_N$ for bit errors. While the Fault_Injection_Enable signal 212 remains unasserted, the fault injection and evaluation state machine 220 remains in the IDLE state. While the state machine 220 remains in the IDLE state, the FuSa logic 205 bypasses the state machine 220 and is coupled to the logic 0 input of the MUX 210a. The APSS 204 can cause the FuSa logic 205 to write and read the addresses of the memory devices $203_1$-$203_N$ and can cause the FuSa logic 205 to initiate normal ECC syndrome generation and checker operations to check the accuracy of bits stored in the memory addresses, such as in the data memory elements 107. The APSS 204 can also cause normal memory write and read operations to be performed to write and read the data memory elements 107.

During normal operations of the ECC syndrome generator logic 105 and ECC checker logic 106 that occur when the state machine 220 is in the IDLE state, the ECC syndrome generator logic 105 uses an error correcting code in combination with the data output from the MUX 210a to generate an ECC syndrome that is stored in the ECC memory element 108. Because the Fault_Injection_Enable signal is deasserted at this time, the logic 0 input of MUX 210b is selected as the output of the MUX 210b, which causes the values stored in the data memory 107 and in the ECC memory 108 to be sent to the ECC checker logic 106 unaltered. The ECC checker logic 106 processes these values in the manner described above with reference to FIG. 1 to determine whether the data stored in the data memory 107 contains one or more bit errors. This information is then sent to the ECC logger 112, which logs the information and outputs the ECC logged entry to the FuSa logic 205.

When the Fault_Injection_Enable signal 212 output by the FuSa logic 205 is asserted to test the ECC syndrome generator and checker logic 105 and 106, respectively, the MUX 210a selects the logic 1 input, FI_CTRL, as the output of the MUX 210a and the MUX 210b selects the logic 1 input. During the WRITE TO MEMORY state of the fault injection state machine 220, the ECC syndrome generator logic 105 receives the preselected test bit pattern output by the MUX 210a and processes it in the manner described above to produce a predefined syndrome that is stored in the ECC memory 108.

When the state machine enters the READ MEMORY state, the values stored in the data memory 107 and in the ECC memory 108 are read out and inverted by inverter 210c before being sent to the ECC checker logic 106. Because the values are inverted, the ECC checker logic 106 generates a fault signature that is logged by the ECC logger 112 and sent by the ECC logger 112 to the fault injection state machine 220, which is now in the GET LOG DATA state. The state machine 220 then enters the COMPARE state. The process then continues in the manner described above with reference to FIG. 2 until all of the addresses in all of the memory devices $203_1$-$203_N$ have been checked. Any detected faults are captured in the CAPTURE FAULT state, reported and the GPU_ECC_FAULT_IRQ interrupt 213 is issued. For each reported fault, the report will typically include the fault signature, a memory device identifier, the memory address location, and the type of fault (e.g., single bit fail or multibit fail). The state machine 220 comprises fault decision logic that performs the steps associated with the READ MEMORY, GET LOG DATA, COMPARE and CAPTURE FAULT states, which are all involved in obtaining the logged fault signature, evaluating the logged signature and taking one or more actions based on the evaluation.

Figure 4:
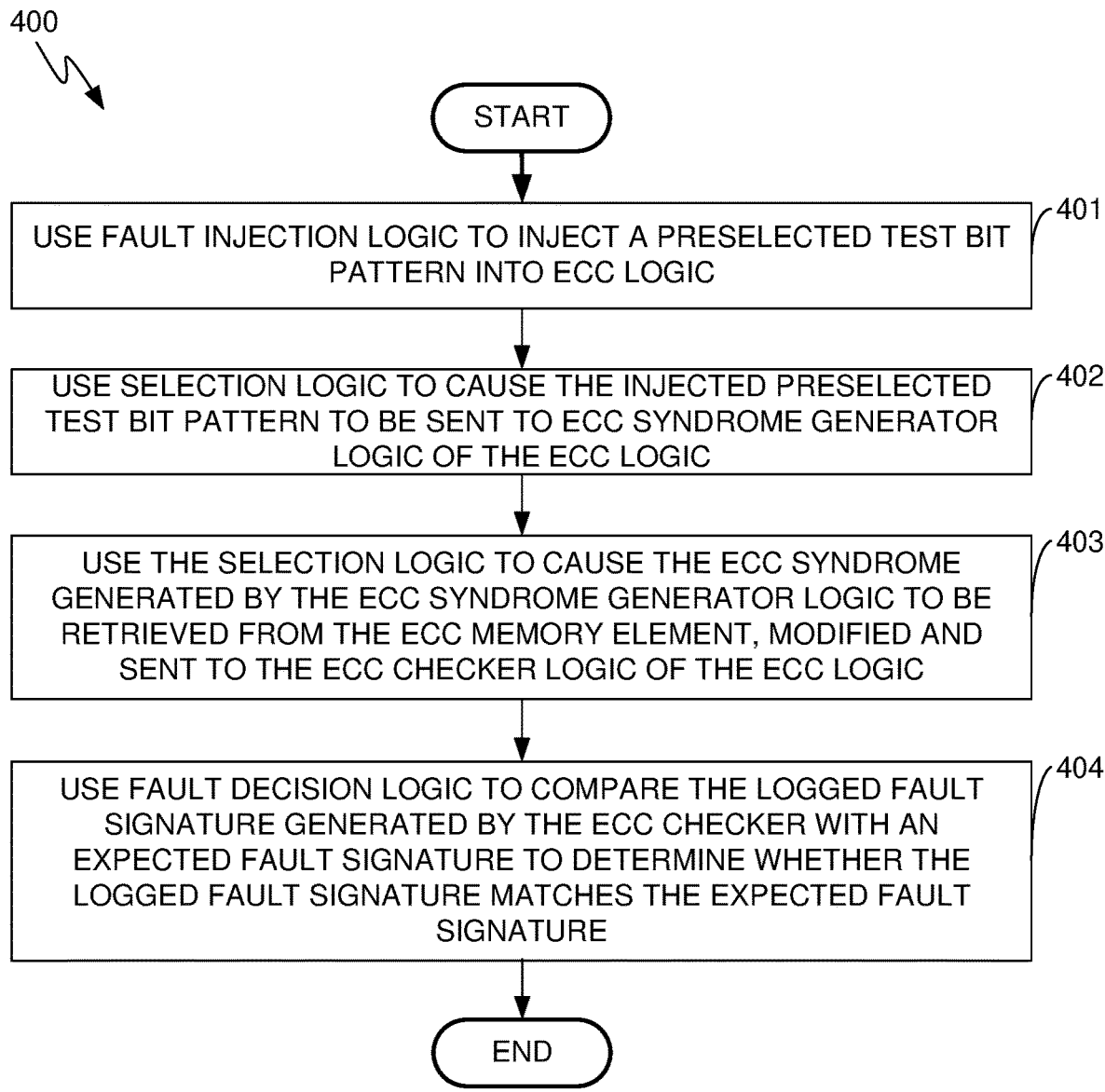
FIG. 4 is a flow diagram of the method for testing ECC logic in accordance with a representative embodiment.

FIG. 4 is a flow diagram representing the method 400 for testing ECC logic in accordance with a representative embodiment in which the ECC logic 104 comprises the ECC syndrome generator logic 105 and the ECC checker logic 106 shown in FIGS. 1 and 3, although the method could also be used to test ECC logic having other configurations. Block 401 represents the step of using fault injection logic to inject a preselected test bit pattern into the ECC logic 104. Block 402 represents the step of using selection logic to cause the injected test bit pattern to be sent to the ECC syndrome generator logic 105. The ECC syndrome generator logic 105 processes the injected test bit pattern to generate an ECC syndrome that is stored in a first ECC memory of a first memory device in which the ECC logic is implemented.

Block 403 represents the step of using the selection logic (MUX 210b and inverter 210c) to retrieve the ECC syndrome from the first ECC memory element, alter the ECC syndrome in a predefined manner (inverter 210c) and send the altered ECC syndrome to the ECC checker logic 106. The ECC checker logic 106 receives the altered ECC syndrome and processes the altered ECC syndrome in the manner described above to generate a fault signature that is logged by the ECC logger. Block 404 represents the step of using fault decision logic to compare (COMPARE state of state machine 220) the logged fault signature with an expected fault signature to determine whether the logged fault signature matches the expected fault signature.

The process represented by the flow diagram of FIG. 4 preferably is performed for every memory address of every memory device $203_1$-$203_N$ of the system 200. In addition, if any fault is detected at block 404, preferably the fault is logged, a report is generated or updated to identify the fault and an interrupt is issued. If no fault is detected in the ECC logic of any of the memory devices $203_1$-$203_N$ of the system 200 at the step represented by block 404, preferably the processor in which the system 200 is employed, e.g., the GPU 201, can begin processing workloads. Because this process preferably is performed at power up of the processor 201, there will not yet be any workloads queued for processing by the GPU 201.

Figure 5:
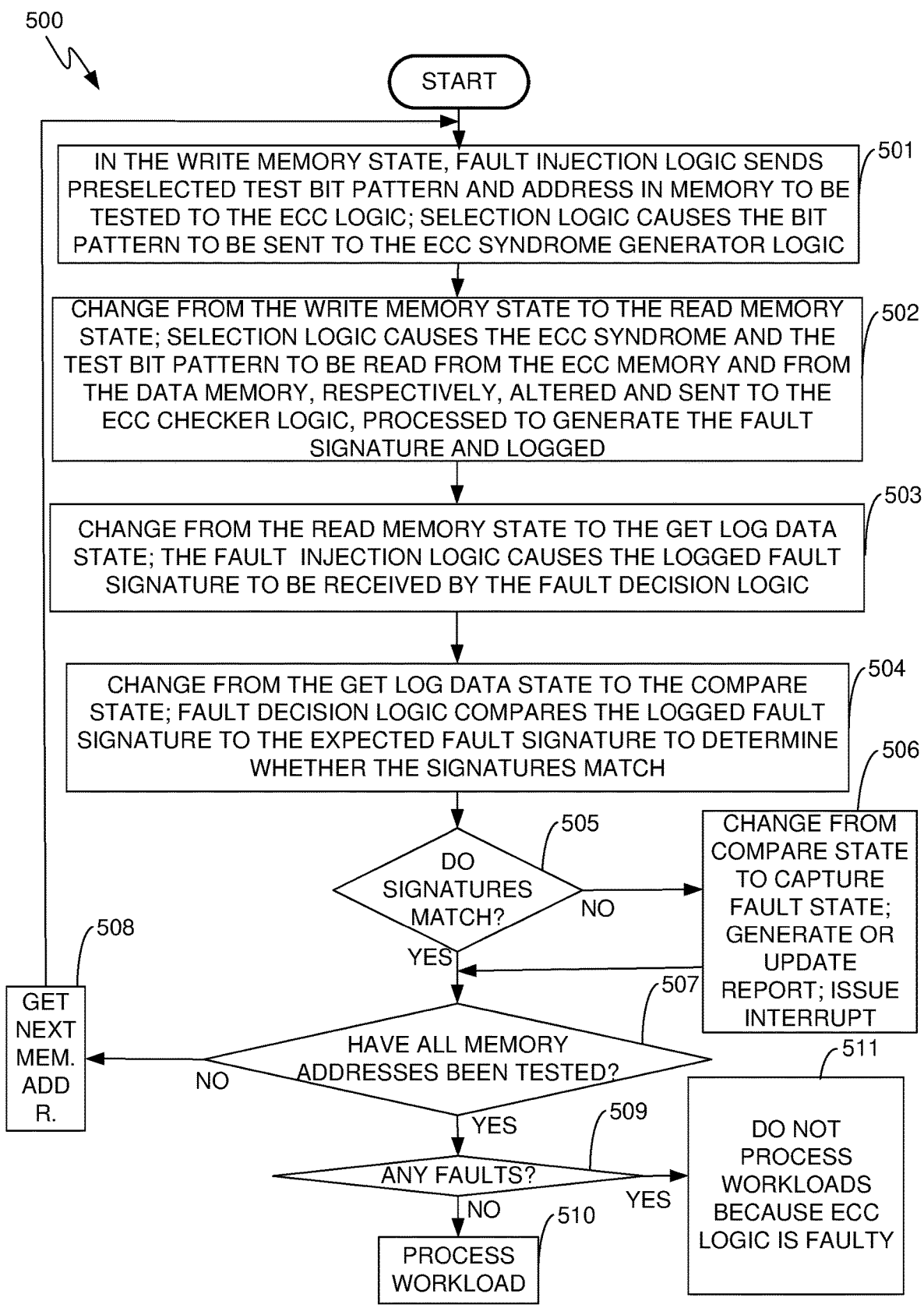
FIG. 5 is a flow diagram of the method in accordance with a preferred embodiment in which the state machine shown in FIGS. 2 and 3 controls the testing of the ECC logic.

FIG. 5 is a flow diagram of the method 500 in accordance with a preferred embodiment in which the state machine 220 controls the testing of the ECC logic in the manner described above with reference to FIGS. 2 and 3. At power up of the system 200, the state machine 220 enters the IDLE state and remains in the IDLE state until the Fault_Injection_Enable signal 212 is asserted. This happens when one or more preselected bits in one of the registers of the FuSa logic 205 is asserted. When this happens, fault injection logic of the fault injection and evaluation state machine 220 changes from the IDLE state to the WRITE MEMORY state and sends the preselected test bit pattern and the address in memory to be tested to the ECC logic 105-108. Selection logic 210a receives the fault injection enable signal 212 and the preselected test bit pattern and causes the preselected test bit pattern to be sent to the ECC syndrome generator logic 105. These steps are represented by block 501 of the flow diagram of FIG. 5.

Block 502 represents the fault injection and evaluation state machine 220 changing from the WRITE MEMORY state to the READ MEMORY state and selection logic and alteration logic 210b and 210c, respectively, causing the ECC syndrome and the test bit pattern to be read from the ECC memory 108 and from the data memory 107, respectively, altered (e.g., inverted) and sent to the ECC checker logic 106, which processes the altered ECC syndrome and the test bit pattern to generate the syndrome, compares the syndrome to the syndrome stored in ECC memory 108 to generate the fault signature, and causes the fault signature to be logged by the ECC logger 112. Block 503 represents fault decision logic of the fault injection and evaluation state machine 220 changing from the READ MEMORY state to the GET LOG DATA state and causing the logged fault signature to be received by fault decision logic of the fault injection and evaluation state machine 220.

Block 504 represents fault decision logic of the state machine 220 changing from the GET LOG DATA state to the COMPARE state and comparing the logged fault signature with the expected fault signature to determine whether the logged fault signature matches the expected fault signature. Block 505 represents the process of the fault decision logic of the state machine 220 determining whether or not the signatures match. Block 506 represents the process of the state machine 220 changing from the COMPARE state to the CAPTURE FAULT state if, during the COMPARE state, the fault decision logic determines at block 505 that the logged fault signature does not match the expected fault signature. During the CAPTURE FAULT state, the fault decision logic of the state machine 220 preferably generates an interrupt and generates or updates a report in the FuSa logic 105 to indicate that a fault has been detected in the ECC checker logic. The process then proceeds to block 507.

Block 507 represents the process of the state machine 220 determining whether all of the memory addresses of all of the memory devices have been tested, and if not, getting the next memory address to be tested at block 508 (e.g., incrementing the memory address pointer) and then returning to block 501. If it is determined at block 507 that all of the memory addresses of all of the memory devices have been tested, the process proceeds to block 509 at which a determination is made as to whether or not any faults were detected at block 505. If not, the process proceeds to block 510 at which the processor can begin processing the workloads. Otherwise, the process proceeds to block 511 and does not process workloads during mission mode because the ECC logic is faulty.

It should be noted that many additions, deletions and other modifications may be made to the process represented by the flow diagram of FIG. 5. The modification of the ECC syndrome that is made by the selection logic can be made in different ways. Preferably, the inverter 210c and the logic 1 input of the second MUX 210b perform the alteration by inverting the ECC syndrome read from the ECC memory 108. This relatively low-complexity, low-cost logic configuration for altering the ECC syndrome can be implemented in a very small area of the SoC 202, but other logic configurations can be used for this purpose. The fault decision logic of the state machine 220 just needs to be aware of the manner in which the ECC syndrome will be altered so that it will know what the expected fault signature will be.

Figure 6:
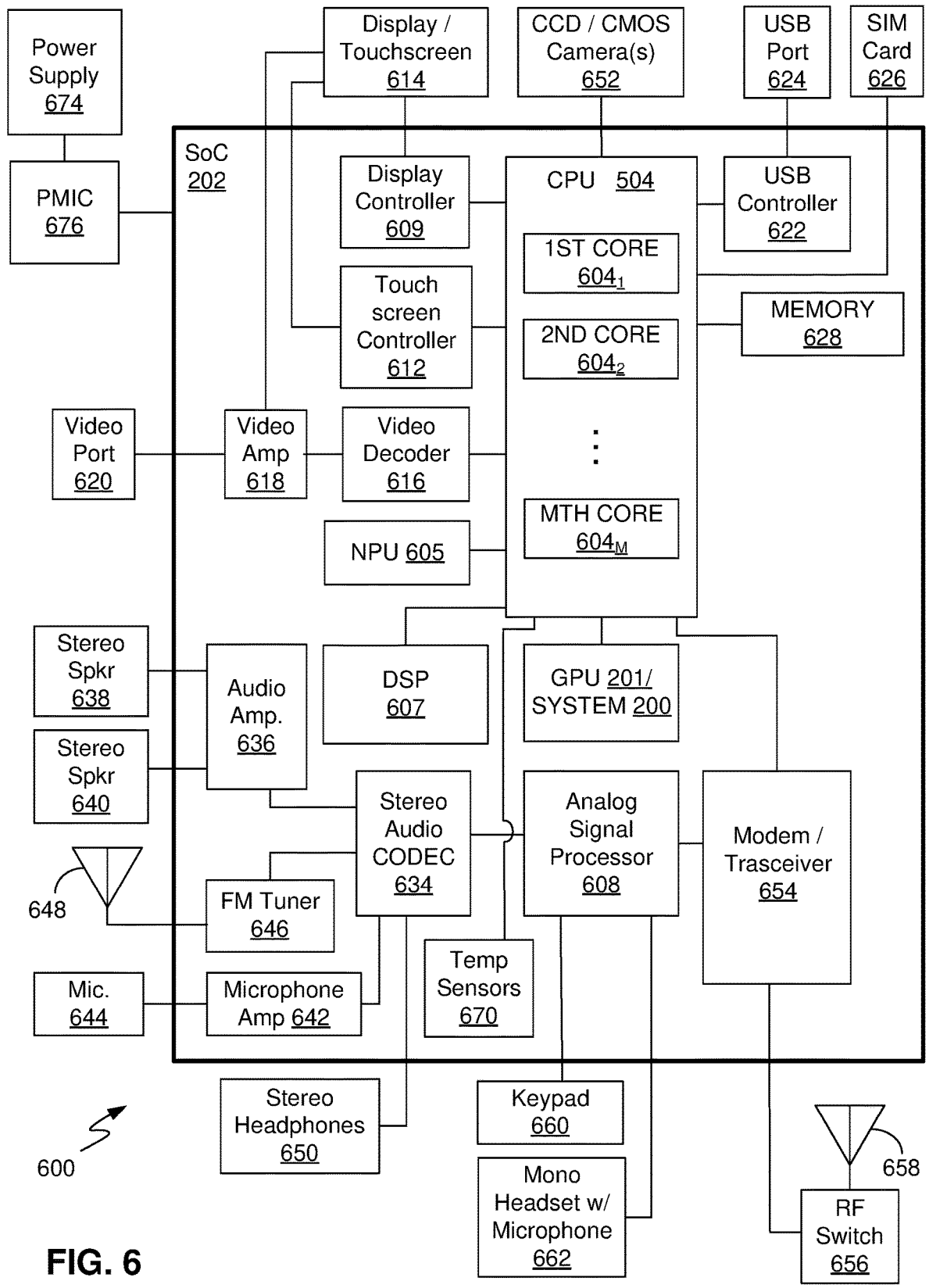
FIG. 6 illustrates an example of a PCD, such as a mobile phone, a smartphone, a portable game console such as an Extended Reality (XR) device, a Virtual Reality (VR) device, an Augmented Reality (AR) device, or a Mixed Reality (MR) device, server, etc., in which exemplary embodiments of systems and methods disclosed herein according to the inventive principles and concepts may be implemented.

FIG. 6 illustrates an example of a PCD 600, such as a mobile phone, a smartphone, a portable game console such as an Extended Reality (XR) device, a Virtual Reality (VR) device, an Augmented Reality (AR) device, or a Mixed Reality (MR) device, server, etc., in which exemplary embodiments of systems and methods disclosed herein according to the inventive principles and concepts may be implemented. The PCD 600 comprises the SoC 202 shown in FIGS. 2 and 3, which comprises the system 200 and GPU 201 shown in FIGS. 2 and 3. For purposes of clarity, some interconnects, signals, etc., are not shown in FIG. 6.

The SoC 202 may also include, for example, a CPU 604, an NPU 605, a DSP 607, an analog signal processor 608, a modem/modem subsystem 654, or other processors. The CPU 604 may include one or more CPU cores, such as a first CPU core $604_1$, a second CPU core $604_2$, etc., through an $M^{th}$ CPU core $604_M$.

A display controller 609 and a touch-screen controller 612 may be coupled to the CPU 604. A touchscreen display 614 external to the SoC 202 may be coupled to the display controller 610 and the touch-screen controller 612. The PCD 600 may further include a video decoder 616 coupled to the CPU 604. A video amplifier 618 may be coupled to the video decoder 616 and the touchscreen display 614. A video port 620 may be coupled to the video amplifier 618. A universal serial bus ("USB") controller 622 may also be coupled to CPU 604, and a USB port 624 may be coupled to the USB controller 622. A subscriber identity module ("SIM") card 626 may also be coupled to the CPU 604.

One or more memories 628 may be coupled to the CPU 604. The one or more memories 628 may include both volatile and non-volatile memories. Examples of volatile memories include static random access memory ("SRAM") and dynamic random access memory ("DRAM"). Such memories may be external to the SoC 202 or internal to the SoC 202. The one or more memories 628 may include local cache memory or a system-level cache memory.

A stereo audio CODEC 634 may be coupled to the analog signal processor 608. Further, an audio amplifier 636 may be coupled to the stereo audio CODEC 634. First and second stereo speakers 638 and 640, respectively, may be coupled to the audio amplifier 636. In addition, a microphone amplifier 642 may be coupled to the stereo audio CODEC 634, and a microphone 644 may be coupled to the microphone amplifier 642. A frequency modulation ("FM") radio tuner 646 may be coupled to the stereo audio CODEC 634. An FM antenna 648 may be coupled to the FM radio tuner 646. Further, stereo headphones 650 may be coupled to the stereo audio CODEC 634. Other devices that may be coupled to the CPU 604 include one or more digital (e.g., CCD or CMOS) cameras 652.

A modem or RF transceiver 654 may be coupled to the analog signal processor 608 and the CPU 604. An RF switch 656 may be coupled to the RF transceiver 654 and an RF antenna 658. In addition, a keypad 660 and a mono headset with a microphone 662 may be coupled to the analog signal processor 608. The SoC 602 may have one or more internal or on-chip thermal sensors 670. A power supply 674 and a PMIC 676 may supply power to the SoC 202.

Firmware or software may be stored in any of the above-described memories, or may be stored in a local memory directly accessible by the processor hardware on which the software or firmware executes. Execution of such firmware or software by the system 200 may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Figure 7:
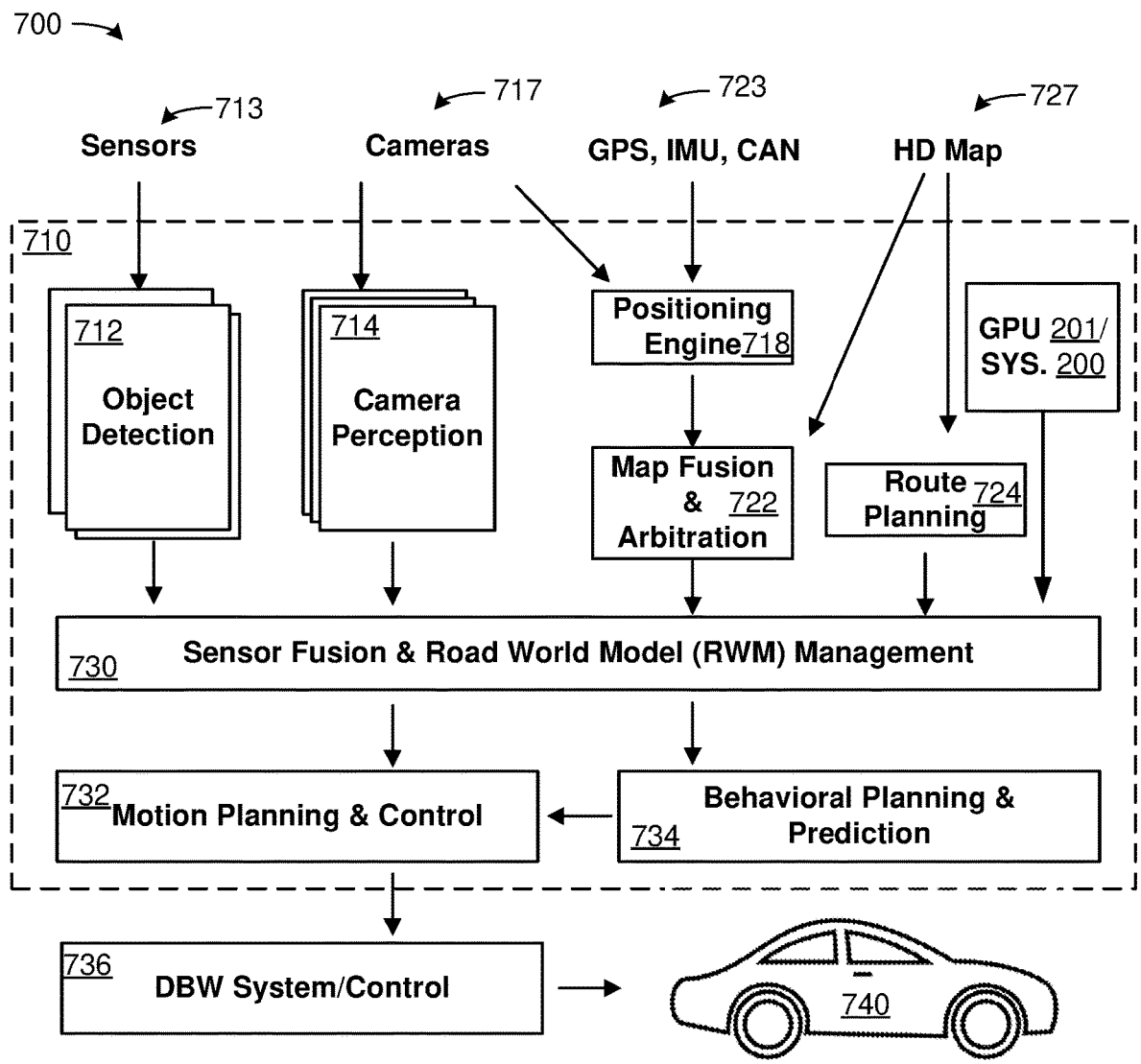
FIG. 7 illustrates a system comprising components of a vehicle automated driving system in accordance with a representative embodiment in which the system and GPU shown in FIG. 1 may be employed.

FIG. 7 illustrates a system 700 comprising components of a vehicle automated driving system in accordance with a representative embodiment in which the system 200 and GPU 201 shown in FIG. 2 may be employed. The vehicle automated driving system may include a processing module 710 and a drive-by-wire (DBW) system controller 736. The system 200 shown in FIG. 2 and the GPU 201 shown in FIG. 2, or some other processor that incorporates the system 200, may be implemented in the processing module 710. The processing module 710 may be, for example, an SoC and may include additional components, such as those shown in FIG. 6. The processing module 710 may include one or more object detection elements 712 and one or more camera perception elements 714. For example, an object detection element 712 may receive inputs from one or more sensors 713; and a camera perception element 714 may receive input from one or more cameras 717.

In an exemplary embodiment, the processing module 710 also may include a positioning engine 718, a map fusion & arbitration element 722 and a route planning element 724. In an exemplary embodiment, the positioning engine 718 may receive inputs from the cameras 717 and from positioning inputs 723. The positioning inputs 723 may be, for example, global positioning system (GPS) data, inertial measurement unit (IMU) data, controller area network (CAN) data, etc. For example, the map fusion & arbitration element 722 and the route planning element 724 may receive map inputs from a high definition map element 727.

In an exemplary embodiment, the processing module 710 also may include a sensor fusion & road world model (RWM) management element 730, a motion planning & control element 732 and a behavioral planning & prediction element 734. In an exemplary embodiment, the sensor fusion & road world model (RWM) management element 730 may receive inputs from the object detection element 712, the camera perception element 714, the map fusion & arbitration element 722 and the route planning element 724 to develop a road world model. The GPU 201 and the system 200 shown in FIG. 2 may be employed in, for example, the sensor fusion & RWM management element 730 for processing the data received from elements 712, 714, 722, and 724. In an exemplary embodiment, a road world model may be an intelligent world model for an automated driving automobile.

In an exemplary embodiment, the sensor fusion & RWM management element 730 may provide outputs to the motion planning & control element 732 and the behavioral planning & prediction element 734. The behavioral planning & prediction element 734 may also provide an output to the motion planning & control element 732. An output of the processing module 710 may be provided to the drive-by-wire (DBW) system controller 736, which may provide automated driving instructions to an automobile 740.

It should be noted that the systems 600 and 700 shown in FIGS. 6 and 7, respectively, are examples of systems in which the system 200 shown in FIGS. 2 and 3 may be employed. However, ECC checkers are used in many different applications and systems. Therefore, any applications and systems that can benefit from the inventive principles and concepts disclosed herein can employ the system 200. Also, while the system 200 has been described as being employed in an SoC, it is not limited to being employed in an SoC.

Implementation examples are described in the following numbered clauses:

1. An error correction coding (ECC) test system for testing ECC logic of at least a first memory device, the ECC logic being used to check memory of at least the first memory device for bit errors, the ECC logic comprising ECC syndrome generator logic and ECC checker logic, the ECC test system comprising:

fault injection logic configured to inject a first preselected test bit pattern into the ECC logic for processing by the ECC syndrome generator logic to generate a first ECC syndrome that is stored in a first ECC memory of the first memory device, the fault injection logic being configured to retrieve the first ECC syndrome from the first ECC memory, alter the retrieved first ECC syndrome in a predetermined manner and cause the altered first ECC syndrome to be processed by the ECC checker logic to generate a first fault signature that is logged by an ECC logger; and fault decision logic configured to receive the logged first fault signature from the ECC logger and to compare the logged first fault signature with an expected fault signature to determine whether the logged first fault signature matches the expected fault signature.

2. The ECC test system of clause 1, wherein the fault injection logic comprises:

write logic of a fault injection and evaluation state machine, the fault injection and evaluation state machine being configured to change from an IDLE state to a WRITE MEMORY state when a fault injection enable signal is asserted, wherein during the WRITE MEMORY state, the first preselected test bit pattern is injected by the write logic into the ECC logic; and selection logic configured to receive the fault injection enable signal and the first preselected test bit pattern and to cause the first preselected test bit pattern to be sent to the ECC syndrome generator logic when the fault injection and evaluation state machine is in the WRITE MEMORY state.

3. The ECC test system of clause 2, wherein the fault injection and evaluation state machine is further configured to change from the WRITE MEMORY state to a READ MEMORY state after the first ECC syndrome has been stored in the first ECC memory, wherein during the READ MEMORY state, the selection logic causes the first ECC syndrome to be read from the first ECC memory and processed by the ECC checker logic to generate the first fault signature.

4. The ECC test system of clause 3, wherein the fault injection and evaluation state machine comprises the fault decision logic, and wherein the fault injection and evaluation state machine is further configured to change from the READ MEMORY state to a GET LOG DATA state after the first fault signature has been logged by the ECC logger, wherein during the GET LOG DATA state, the logged first fault signature is received by the fault decision logic.

5. The ECC test system of clause 4, wherein the fault injection and evaluation state machine is further configured to change from the GET LOG DATA state to a COMPARE state after the logged first fault signature has been received by the fault decision logic, wherein during the COMPARE state, the fault decision logic compares the logged first fault signature with the expected fault signature to determine whether the logged first fault signature matches the expected fault signature.

6. The ECC test system of clause 5, wherein the fault injection and evaluation state machine is further configured to change from the COMPARE state to a CAPTURE FAULT state if, during the COMPARE state, the fault decision logic determines that the logged first fault signature does not match the expected fault signature, and wherein the fault decision logic is further configured to generate an interrupt during the CAPTURE FAULT state that is output from the ECC test system to inform one or more systems that a fault has been detected in the ECC logic.

7. The ECC test system of clause 5, wherein the fault injection and evaluation state machine is further configured to change from the COMPARE state to a CAPTURE FAULT state if, during the COMPARE state, the fault decision logic determines that the logged first fault signature does not match the expected fault signature, and wherein the fault decision logic is further configured to generate a report during the CAPTURE FAULT state that indicates that a fault has been detected in the ECC logic.

8. The ECC test system of any of clauses 5-7, wherein the fault injection and evaluation state machine is further configured to return to the WRITE MEMORY state from the COMPARE state if, during the COMPARE state, the fault decision logic determines that the logged first fault signature matches the expected fault signature, and wherein when the fault injection and evaluation state machine returns to the WRITE MEMORY state, a second preselected test bit pattern is injected by the write logic into the ECC logic and processed by the ECC syndrome generator logic to generate a second ECC syndrome that is stored in a second ECC memory of the first memory device.

9. The ECC test system of any of clauses 3-8, wherein the fault injection logic further comprises an inverter, and wherein the selection logic comprises a first multiplexer (MUX) and a second MUX, the first and second MUXes each having at least first and second inputs and an output, the second input of the first MUX being electrically coupled to the fault injection logic such that the first preselected test bit pattern is received at the second input of the first MUX and outputted from the output of the first MUX and inputted to the ECC syndrome generator logic when the fault injection and evaluation state machine is in the WRITE MEMORY state, and wherein the first ECC syndrome generated by the ECC syndrome generator is stored in the first ECC memory by the fault injection logic when the fault injection and evaluation state machine is in the WRITE MEMORY state.

10. The ECC test system of clause 9, wherein the output of the second MUX is electrically coupled to an input of the ECC checker logic, and wherein the second input of the second MUX is electrically coupled via the inverter to an output of the first ECC memory, and wherein the first ECC syndrome stored in the first ECC memory is inverted by the inverter, outputted from the output of the second MUX and inputted to the ECC checker logic via the input of the ECC checker logic when the fault injection and evaluation state machine is in the READ MEMORY state.

11. A method for testing error correction coding (ECC) logic of at least a first memory device, the ECC logic being used to check memory of at least a first memory device for bit errors, the method comprising:

using fault injection logic to cause a first preselected test bit pattern to be injected into the ECC logic and sent to ECC syndrome generator logic of the ECC logic, the ECC syndrome generator logic processing the injected first preselected test bit pattern to generate a first ECC syndrome that is stored in a first ECC memory of the first memory device;

using the fault injection logic to retrieve the first ECC syndrome from the first ECC memory, alter the first ECC syndrome in a predetermined manner and send the altered first ECC syndrome to the ECC checker logic, the ECC checker logic receiving the altered first ECC syndrome and processing the altered first ECC syndrome to generate a first fault signature that is logged by an ECC logger; and using fault decision logic to compare the logged first fault signature with an expected fault signature to determine whether the logged first fault signature matches the expected fault signature.

12. The method of clause 11, wherein the fault injection logic comprises a fault injection and evaluation state machine and selection logic, the method further comprising:

with the fault injection and evaluation state machine, changing from an IDLE state to a WRITE MEMORY state when a fault injection enable signal is asserted, wherein write logic of the fault injection and evaluation state machine injects the first preselected test bit pattern into the ECC logic during the WRITE MEMORY state; and with the selection logic, when the fault injection and evaluation state machine is in the WRITE MEMORY state, receiving the fault injection enable signal and the first preselected test bit pattern and causing the first preselected test bit pattern to be sent to the ECC syndrome generator logic, and wherein the ECC syndrome generator logic processes the first preselected test bit pattern to generate the first ECC syndrome and causes the first ECC syndrome to be stored in the first ECC memory when the fault injection and evaluation state machine is in the WRITE MEMORY state.

13. The method of clause 12, further comprising:

with the fault injection and evaluation state machine, changing from the WRITE MEMORY state to a READ MEMORY state after the first ECC syndrome has been stored in the first ECC memory; and with the selection logic, during the READ MEMORY state, causing the first ECC syndrome to be read from the first ECC memory, altered in said predetermined manner by the fault injection logic and sent to the ECC checker logic for processing by the ECC checker logic to generate the first fault signature.

14. The method of clause 13, wherein the fault injection and evaluation state machine comprises the fault decision logic, and wherein the method further comprises:

with the fault injection and evaluation state machine, changing from the READ MEMORY state to a GET LOG DATA state after the first fault signature has been logged by the ECC logger; and with the fault decision logic, during the GET LOG DATA state, causing the logged first fault signature to be received by the fault decision logic.

15. The method of clause 14, further comprising:

with the fault injection and evaluation state machine, changing from the GET LOG DATA state to a COMPARE state after the logged first fault signature has been received by the fault decision logic; and with the fault decision logic, during the COMPARE state, comparing the logged first fault signature with the expected fault signature to determine whether the logged first fault signature matches the expected fault signature.

16. The method of clause 15, further comprising:

with the fault injection and evaluation state machine, changing from the COMPARE state to a CAPTURE FAULT state if, during the COMPARE state, the fault decision logic determines that the logged first fault signature does not match the expected fault signature; and with the fault decision logic, during the CAPTURE FAULT state, generating an interrupt that indicates that a fault has been detected in the ECC logic.

17. The method of clause 15, further comprising:

with the fault injection and evaluation state machine, changing from the COMPARE state to a CAPTURE FAULT state if, during the COMPARE state, the fault decision logic determines that the logged first fault signature does not match the expected fault signature; and with the fault decision logic, during the CAPTURE FAULT state, generating a report indicating that a fault has been detected in the ECC checker logic.

18. The method of any of clauses 15-17, further comprising:

with the fault injection and evaluation state machine, returning to the WRITE MEMORY state from the COMPARE state if, during the COMPARE state, the fault decision logic determines that the logged first fault signature matches the expected fault signature; and with the fault injection logic, when the fault injection and evaluation state machine returns to the WRITE MEMORY state, injecting a second preselected test bit pattern into the ECC logic to cause the second preselected test bit pattern to be processed by the ECC syndrome generator logic to generate a second ECC syndrome that is stored in a second ECC memory element of the first memory device.

19. The method of any of clauses 13-18, wherein the fault injection logic further comprises an inverter, and wherein the selection logic comprises a first multiplexer (MUX) and a second MUX, the first and second MUXes each having at least first and second inputs and an output, the second input of the first MUX being electrically coupled to the fault injection logic such that the first preselected test bit pattern is received at the second input of the first MUX and outputted from the output of the first MUX and inputted to the ECC syndrome generator when the fault injection and evaluation state machine is in the WRITE MEMORY state, and wherein the first ECC syndrome generated by the ECC syndrome generator is stored in the first ECC memory by the fault injection logic when the fault injection and evaluation state machine is in the WRITE MEMORY state.

20. The method of clause 19, wherein the output of the second MUX is electrically coupled to an input of the ECC checker logic and the second input of the second MUX is electrically coupled via the inverter to an output of the first ECC memory, and wherein the step of retrieving the first ECC syndrome from the first ECC memory, altering the first ECC syndrome in said predetermined manner and sending the altered first ECC syndrome to the ECC checker logic is performed by the second MUX and the inverter when the fault injection and evaluation state machine is in the READ MEMORY state.

21. A computer program for testing error correction coding (ECC) logic of at least a first memory device, the ECC logic being used to check memory of at least the first memory device for bit errors, the computer program comprising computer instructions for execution by a processor, the computer program being embodied on a non-transitory computer readable medium, the computer program comprising:

a first set of computer instructions for causing fault injection logic to inject a first preselected test bit pattern into the ECC logic;

a second set of computer instructions for causing the fault injection logic to send the first preselected test bit pattern to ECC syndrome generator logic of the ECC logic, the ECC syndrome generator logic processing the first preselected test bit pattern to generate a first ECC syndrome that is stored in a first ECC memory of the first memory device;

a third set of computer instructions for causing the fault injection logic to retrieve the first ECC syndrome from the first ECC memory, alter the first ECC syndrome in a predetermined manner and send the altered first ECC syndrome to ECC checker logic of the ECC logic for processing of the altered first ECC syndrome to generate a first fault signature that is logged by an ECC logger; and a fourth set of computer instructions for causing fault decision logic to compare the logged first fault signature with an expected fault signature to determine whether the logged first fault signature matches the expected fault signature.

22. The computer program of clause 21, wherein the fault injection logic comprises a fault injection and evaluation state machine, and wherein the first and fourth sets of computer instructions are performed by the fault injection and evaluation state machine, wherein when performing the first set of computer instructions, the fault injection and evaluation state machine changes from an IDLE state to a WRITE MEMORY state when a fault injection enable signal is asserted, and wherein during the WRITE MEMORY state, the first set of computer instructions causes the first preselected test bit pattern to be injected by write logic of the fault injection and evaluation state machine into the ECC logic, and wherein during the WRITE MEMORY state, the second set of computer instructions causes the fault injection logic to send the injected first preselected test bit pattern to the ECC syndrome generator logic for generation of the first ECC syndrome and causes the first ECC syndrome to be stored in the first ECC memory.

23. The computer program of clause 22, wherein the fault injection and evaluation state machine changes from the WRITE MEMORY state to a READ MEMORY state after the first ECC syndrome has been stored in the first ECC memory, and wherein during the READ MEMORY state, the third set of computer instructions causes the fault injection logic to read the first ECC syndrome from the first ECC memory, alter the read first ECC syndrome in said predetermined manner, and send the altered first ECC syndrome to the ECC checker logic for processing by the ECC checker logic to generate the first fault signature.

24. The computer program of clause 23, wherein the fault injection and evaluation state machine changes from the READ MEMORY state to a GET LOG DATA state after the first fault signature has been logged by the ECC logger, and wherein during the GET LOG DATA state, the fourth set of computer instructions causes the fault decision logic to receive the logged first fault signature.

25. The computer program of clause 24, wherein the fault injection and evaluation state machine changes from the GET LOG DATA state to a COMPARE state after the logged first fault signature has been received by the fault decision logic, and wherein the fourth set of computer instructions causes the fault decision logic, during the COMPARE state, to compare the logged first fault signature with the expected fault signature to determine whether the logged first fault signature matches the expected fault signature.

26. The computer program of clause 25, wherein the fault injection and evaluation state machine changes from the COMPARE state to a CAPTURE FAULT state if, during the COMPARE state, the fault injection logic determines that the logged first fault signature does not match the expected fault signature, and wherein the fourth set of computer instructions further comprises computer instructions for causing the fault decision logic, during the CAPTURE FAULT state, to perform at least one of generating an interrupt that indicates that a fault has been detected in the ECC logic and generating a report indicating that a fault has been detected in the ECC checker logic.

27. The computer program of clause 25, wherein the fault injection and evaluation state machine returns to the WRITE MEMORY state from the COMPARE state if, during the COMPARE state, the fourth set of computer instructions performed by the fault decision logic determines that the logged first fault signature matches the expected fault signature, and wherein when the fault injection and evaluation state machine returns to the WRITE MEMORY state, the first set of computer instructions causes the write logic to inject a second preselected test bit pattern into the ECC logic and the second set of computer instructions causes the second preselected test bit pattern to be sent to the ECC syndrome generator logic for generation of a second ECC syndrome, the second set of computer instructions causing the second ECC syndrome to be stored in a second ECC memory element of the first memory device.

28. The computer program of any of clauses 23-27, wherein the fault injection logic further comprises an inverter, and wherein the selection logic comprises a first multiplexer (MUX) and a second MUX and an inverter, the first and second MUXes each having at least first and second inputs and an output, the second input of the first MUX being electrically coupled to the fault injection logic such that the first set of computer instructions causes the first preselected test bit pattern to be received at the second input of the first MUX, outputted from the output of the first MUX and inputted to the ECC syndrome generator by the fault injection logic when the fault injection and evaluation state machine is in the WRITE MEMORY state, and wherein the second set of computer instructions causes the selection logic to store the first ECC syndrome generated by the ECC syndrome generator in the first ECC memory when the fault injection and evaluation state machine is in the WRITE MEMORY state.

29. The computer program of clause 28, wherein the output of the second MUX is electrically coupled to an input of the ECC checker logic and the second input of the second MUX is electrically coupled via the inverter to an output of the first ECC memory, and wherein when the fault injection and evaluation state machine is in the READ MEMORY state, the third set of computer instructions causes the fault injection logic to retrieve the first ECC syndrome from the first ECC memory, apply the retrieved first ECC syndrome to the second input of the second MUX to cause the retrieved first ECC syndrome to be altered via the inverter and sent to the input of the ECC checker logic.

30. An error correction coding (ECC) test system for testing ECC logic of at least a first memory device, the ECC logic being used to check memory of at least the first memory device for bit errors, the ECC logic comprising ECC syndrome generator logic and ECC checker logic, the ECC test system comprising:

means for injecting a preselected test bit pattern into the ECC logic for processing by the ECC syndrome generator logic to generate an ECC syndrome that is stored in a first ECC memory of the first memory device;

means for retrieving the ECC syndrome from the first ECC memory;

means for altering the retrieved ECC syndrome in a predetermined manner;

means for causing the altered ECC syndrome to be sent to the ECC checker logic for processing by the ECC checker logic to generate a fault signature that is logged by an ECC logger; and means for receiving the logged fault signature from the ECC logger and for comparing the logged fault signature with an expected fault signature to determine whether the logged fault signature matches the expected fault signature.

Alternative embodiments will become apparent to one of ordinary skill in the art to which the invention pertains. Therefore, although selected aspects have been illustrated and described in detail, it will be understood that various substitutions and alterations may be made therein, and that all such modifications are within the scope of the present disclosure.

What is claimed is:

1. An error correction coding (ECC) test system for testing ECC logic of at least a first memory device, the ECC logic being used to check memory of at least the first memory device for bit errors, the ECC logic comprising ECC syndrome generator logic and ECC checker logic, the ECC test system comprising:

fault injection logic configured to inject a first preselected test bit pattern into the ECC logic for processing by the ECC syndrome generator logic to generate a first ECC syndrome that is stored in a first ECC memory of the first memory device, the fault injection logic being configured to retrieve the first ECC syndrome from the first ECC memory, alter the retrieved first ECC syndrome by inverting one or more bits and cause the altered first ECC syndrome to be processed by the ECC checker logic to generate a first fault signature that is logged by an ECC logger; and fault decision logic configured to receive the logged first fault signature from the ECC logger and to compare the logged first fault signature with an expected fault signature to determine whether the logged first fault signature matches the expected fault signature.

2. The ECC test system of claim 1, wherein the fault injection logic comprises:

write logic of a fault injection and evaluation state machine, the fault injection and evaluation state machine being configured to change from an IDLE state to a WRITE MEMORY state when a fault injection enable signal is asserted, wherein during the WRITE MEMORY state, the first preselected test bit pattern is injected by the write logic into the ECC logic; and selection logic configured to receive the fault injection enable signal and the first preselected test bit pattern and to cause the first preselected test bit pattern to be sent to the ECC syndrome generator logic when the fault injection and evaluation state machine is in the WRITE MEMORY state.

3. The ECC test system of claim 2, wherein the fault injection and evaluation state machine is further configured to change from the WRITE MEMORY state to a READ MEMORY state after the first ECC syndrome has been stored in the first ECC memory, wherein during the READ MEMORY state, the selection logic causes the first ECC syndrome to be read from the first ECC memory and processed by the ECC checker logic to generate the first fault signature.

4. The ECC test system of claim 3, wherein the fault injection logic further comprises an inverter, and wherein the selection logic comprises a first multiplexer (MUX) and a second MUX, the first and second MUXes each having at least first and second inputs and an output, the second input of the first MUX being electrically coupled to the fault injection logic such that the first preselected test bit pattern is received at the second input of the first MUX and outputted from the output of the first MUX and inputted to the ECC syndrome generator logic when the fault injection and evaluation state machine is in the WRITE MEMORY state, and wherein the first ECC syndrome generated by the ECC syndrome generator is stored in the first ECC memory by the fault injection logic when the fault injection and evaluation state machine is in the WRITE MEMORY state.

5. The ECC test system of claim 4, wherein the output of the second MUX is electrically coupled to an input of the ECC checker logic, and wherein the second input of the second MUX is electrically coupled via the inverter to an output of the first ECC memory, and wherein the first ECC syndrome stored in the first ECC memory is inverted by the inverter, outputted from the output of the second MUX and inputted to the ECC checker logic via the input of the ECC checker logic when the fault injection and evaluation state machine is in the READ MEMORY state.

6. The ECC test system of claim 3, wherein the fault injection and evaluation state machine comprises the fault decision logic, and wherein the fault injection and evaluation state machine is further configured to change from the READ MEMORY state to a GET LOG DATA state after the first fault signature has been logged by the ECC logger, wherein during the GET LOG DATA state, the logged first fault signature is received by the fault decision logic.

7. The ECC test system of claim 6, wherein the fault injection and evaluation state machine is further configured to change from the GET LOG DATA state to a COMPARE state after the logged first fault signature has been received by the fault decision logic, wherein during the COMPARE state, the fault decision logic compares the logged first fault signature with the expected fault signature to determine whether the logged first fault signature matches the expected fault signature.

8. The ECC test system of claim 7, wherein the fault injection and evaluation state machine is further configured to change from the COMPARE state to a CAPTURE FAULT state if, during the COMPARE state, the fault decision logic determines that the logged first fault signature does not match the expected fault signature, and wherein the fault decision logic is further configured to generate an interrupt during the CAPTURE FAULT state that is output from the ECC test system to inform one or more systems that a fault has been detected in the ECC logic.

9. The ECC test system of claim 7, wherein the fault injection and evaluation state machine is further configured to change from the COMPARE state to a CAPTURE FAULT state if, during the COMPARE state, the fault decision logic determines that the logged first fault signature does not match the expected fault signature, and wherein the fault decision logic is further configured to generate a report during the CAPTURE FAULT state that indicates that a fault has been detected in the ECC logic.

10. The ECC test system of claim 7, wherein the fault injection and evaluation state machine is further configured to return to the WRITE MEMORY state from the COMPARE state if, during the COMPARE state, the fault decision logic determines that the logged first fault signature matches the expected fault signature, and wherein when the fault injection and evaluation state machine returns to the WRITE MEMORY state, a second preselected test bit pattern is injected by the write logic into the ECC logic and processed by the ECC syndrome generator logic to generate a second ECC syndrome that is stored in a second ECC memory of the first memory device.

11. A method for testing error correction coding (ECC) logic of at least a first memory device, the ECC logic being used to check memory of at least a first memory device for bit errors, the method comprising:
    using fault injection logic to cause a first preselected test bit pattern to be injected into the ECC logic and sent to ECC syndrome generator logic of the ECC logic, the ECC syndrome generator logic processing the injected first preselected test bit pattern to generate a first ECC syndrome that is stored in a first ECC memory of the first memory device;
    using the fault injection logic to retrieve the first ECC syndrome from the first ECC memory, alter the first ECC syndrome by inverting one or more bits and send the altered first ECC syndrome to the ECC checker logic, the ECC checker logic receiving the altered first ECC syndrome and processing the altered first ECC syndrome to generate a first fault signature that is logged by an ECC logger; and
    using fault decision logic to compare the logged first fault signature with an expected fault signature to determine whether the logged first fault signature matches the expected fault signature.

12. The method of claim 11, wherein the fault injection logic comprises a fault injection and evaluation state machine and selection logic, the method further comprising:
    with the fault injection and evaluation state machine, changing from an IDLE state to a WRITE MEMORY state when a fault injection enable signal is asserted, wherein write logic of the fault injection and evaluation state machine injects the first preselected test bit pattern into the ECC logic during the WRITE MEMORY state; and
    with the selection logic, when the fault injection and evaluation state machine is in the WRITE MEMORY state, receiving the fault injection enable signal and the first preselected test bit pattern and causing the first preselected test bit pattern to be sent to the ECC syndrome generator logic, and wherein the ECC syndrome generator logic processes the first preselected test bit pattern to generate the first ECC syndrome and causes the first ECC syndrome to be stored in the first ECC memory when the fault injection and evaluation state machine is in the WRITE MEMORY state.

13. The method of claim 12, further comprising:
    with the fault injection and evaluation state machine, changing from the WRITE MEMORY state to a READ MEMORY state after the first ECC syndrome has been stored in the first ECC memory; and
    with the selection logic, during the READ MEMORY state, causing the first ECC syndrome to be read from the first ECC memory, altered by the fault injection logic and sent to the ECC checker logic for processing by the ECC checker logic to generate the first fault signature.

14. The method of claim 13, wherein the fault injection logic further comprises an inverter, and wherein the selection logic comprises a first multiplexer (MUX) and a second MUX, the first and second MUXes each having at least first and second inputs and an output, the second input of the first MUX being electrically coupled to the fault injection logic such that the first preselected test bit pattern is received at the second input of the first MUX and outputted from the output of the first MUX and inputted to the ECC syndrome generator when the fault injection and evaluation state machine is in the WRITE MEMORY state, and wherein the first ECC syndrome generated by the ECC syndrome generator is stored in the first ECC memory by the fault injection logic when the fault injection and evaluation state machine is in the WRITE MEMORY state.

15. The method of claim 14, wherein the output of the second MUX is electrically coupled to an input of the ECC checker logic and the second input of the second MUX is electrically coupled via the inverter to an output of the first ECC memory, and wherein the step of retrieving the first ECC syndrome from the first ECC memory, altering the first ECC syndrome and sending the altered first ECC syndrome to the ECC checker logic is performed by the second MUX and the inverter when the fault injection and evaluation state machine is in the READ MEMORY state.

16. The method of claim 13, wherein the fault injection and evaluation state machine comprises the fault decision logic, and wherein the method further comprises:
    with the fault injection and evaluation state machine, changing from the READ MEMORY state to a GET LOG DATA state after the first fault signature has been logged by the ECC logger; and
    with the fault decision logic, during the GET LOG DATA state, causing the logged first fault signature to be received by the fault decision logic.

17. The method of claim 16, further comprising:
    with the fault injection and evaluation state machine, changing from the GET LOG DATA state to a COMPARE state after the logged first fault signature has been received by the fault decision logic; and
    with the fault decision logic, during the COMPARE state, comparing the logged first fault signature with the expected fault signature to determine whether the logged first fault signature matches the expected fault signature.

18. The method of claim 17, further comprising:
    with the fault injection and evaluation state machine, changing from the COMPARE state to a CAPTURE FAULT state if, during the COMPARE state, the fault decision logic determines that the logged first fault signature does not match the expected fault signature; and
    with the fault decision logic, during the CAPTURE FAULT state, generating an interrupt that indicates that a fault has been detected in the ECC logic.

19. The method of claim 17, further comprising:
    with the fault injection and evaluation state machine, changing from the COMPARE state to a CAPTURE FAULT state if, during the COMPARE state, the fault decision logic determines that the logged first fault signature does not match the expected fault signature; and
    with the fault decision logic, during the CAPTURE FAULT state, generating a report indicating that a fault has been detected in the ECC checker logic.

20. The method of claim 17, further comprising:
    with the fault injection and evaluation state machine, returning to the WRITE MEMORY state from the COMPARE state if, during the COMPARE state, the fault decision logic determines that the logged first fault signature matches the expected fault signature; and
    with the fault injection logic, when the fault injection and evaluation state machine returns to the WRITE MEMORY state, injecting a second preselected test bit pattern into the ECC logic to cause the second preselected test bit pattern to be processed by the ECC syndrome generator logic to generate a second ECC syndrome that is stored in a second ECC memory element of the first memory device.

21. A computer program for testing error correction coding (ECC) logic of at least a first memory device, the ECC logic being used to check memory of at least the first memory device for bit errors, the computer program comprising computer instructions for execution by a processor, the computer program being embodied on a non-transitory computer readable medium, the computer program comprising:

a first set of computer instructions for causing fault injection logic to inject a first preselected test bit pattern into the ECC logic;

a second set of computer instructions for causing the fault injection logic to send the first preselected test bit pattern to ECC syndrome generator logic of the ECC logic, the ECC syndrome generator logic processing the first preselected test bit pattern to generate a first ECC syndrome that is stored in a first ECC memory of the first memory device;

a third set of computer instructions for causing the fault injection logic to retrieve the first ECC syndrome from the first ECC memory, alter the first ECC syndrome by inverting one or more bits and send the altered first ECC syndrome to ECC checker logic of the ECC logic for processing of the altered first ECC syndrome to generate a first fault signature that is logged by an ECC logger; and a fourth set of computer instructions for causing fault decision logic to compare the logged first fault signature with an expected fault signature to determine whether the logged first fault signature matches the expected fault signature.

22. The computer program of claim 21, wherein the fault injection logic comprises a fault injection and evaluation state machine, and wherein the first and fourth sets of computer instructions are performed by the fault injection and evaluation state machine, wherein when performing the first set of computer instructions, the fault injection and evaluation state machine changes from an IDLE state to a WRITE MEMORY state when a fault injection enable signal is asserted, and wherein during the WRITE MEMORY state, the first set of computer instructions causes the first preselected test bit pattern to be injected by write logic of the fault injection and evaluation state machine into the ECC logic, and wherein during the WRITE MEMORY state, the second set of computer instructions causes the fault injection logic to send the injected first preselected test bit pattern to the ECC syndrome generator logic for generation of the first ECC syndrome and causes the first ECC syndrome to be stored in the first ECC memory.

23. The computer program of claim 22, wherein the fault injection and evaluation state machine changes from the WRITE MEMORY state to a READ MEMORY state after the first ECC syndrome has been stored in the first ECC memory, and wherein during the READ MEMORY state, the third set of computer instructions causes the fault injection logic to read the first ECC syndrome from the first ECC memory, alter the read first ECC syndrome, and send the altered first ECC syndrome to the ECC checker logic for processing by the ECC checker logic to generate the first fault signature.

24. The computer program of claim 23, wherein the fault injection logic further comprises an inverter, and wherein the selection logic comprises a first multiplexer (MUX) and a second MUX and an inverter, the first and second MUXes each having at least first and second inputs and an output, the second input of the first MUX being electrically coupled to the fault injection logic such that the first set of computer instructions causes the first preselected test bit pattern to be received at the second input of the first MUX, outputted from the output of the first MUX and inputted to the ECC syndrome generator by the fault injection logic when the fault injection and evaluation state machine is in the WRITE MEMORY state, and wherein the second set of computer instructions causes the selection logic to store the first ECC syndrome generated by the ECC syndrome generator in the first ECC memory when the fault injection and evaluation state machine is in the WRITE MEMORY state.

25. The computer program of claim 24, wherein the output of the second MUX is electrically coupled to an input of the ECC checker logic and the second input of the second MUX is electrically coupled via the inverter to an output of the first ECC memory, and wherein when the fault injection and evaluation state machine is in the READ MEMORY state, the third set of computer instructions causes the fault injection logic to retrieve the first ECC syndrome from the first ECC memory, apply the retrieved first ECC syndrome to the second input of the second MUX to cause the retrieved first ECC syndrome to be altered via the inverter and sent to the input of the ECC checker logic.

26. The computer program of claim 23, wherein the fault injection and evaluation state machine changes from the READ MEMORY state to a GET LOG DATA state after the first fault signature has been logged by the ECC logger, and wherein during the GET LOG DATA state, the fourth set of computer instructions causes the fault decision logic to receive the logged first fault signature.

27. The computer program of claim 26, wherein the fault injection and evaluation state machine changes from the GET LOG DATA state to a COMPARE state after the logged first fault signature has been received by the fault decision logic, and wherein the fourth set of computer instructions causes the fault decision logic, during the COMPARE state, to compare the logged first fault signature with the expected fault signature to determine whether the logged first fault signature matches the expected fault signature.

28. The computer program of claim 27, wherein the fault injection and evaluation state machine changes from the COMPARE state to a CAPTURE FAULT state if, during the COMPARE state, the fault injection logic determines that the logged first fault signature does not match the expected fault signature, and wherein the fourth set of computer instructions further comprises computer instructions for causing the fault decision logic, during the CAPTURE FAULT state, to perform at least one of generating an interrupt that indicates that a fault has been detected in the ECC logic and generating a report indicating that a fault has been detected in the ECC checker logic.

29. The computer program of claim 27, wherein the fault injection and evaluation state machine returns to the WRITE MEMORY state from the COMPARE state if, during the COMPARE state, the fourth set of computer instructions performed by the fault decision logic determines that the logged first fault signature matches the expected fault signature, and wherein when the fault injection and evaluation state machine returns to the WRITE MEMORY state, the first set of computer instructions causes the write logic to inject a second preselected test bit pattern into the ECC logic and the second set of computer instructions causes the second preselected test bit pattern to be sent to the ECC syndrome generator logic for generation of a second ECC syndrome, the second set of computer instructions causing the second ECC syndrome to be stored in a second ECC memory element of the first memory device.

30. An error correction coding (ECC) test system for testing ECC logic of at least a first memory device, the ECC logic being used to check memory of at least the first memory device for bit errors, the ECC logic comprising ECC syndrome generator logic and ECC checker logic, the ECC test system comprising:
- means for injecting a preselected test bit pattern into the ECC logic for processing by the ECC syndrome generator logic to generate an ECC syndrome that is stored in a first ECC memory of the first memory device;
- means for retrieving the ECC syndrome from the first ECC memory;
- means for altering the retrieved ECC syndrome by inverting one or more bits;
- means for causing the altered ECC syndrome to be sent to the ECC checker logic for processing by the ECC checker logic to generate a fault signature that is logged by an ECC logger; and
- means for receiving the logged fault signature from the ECC logger and for comparing the logged fault signature with an expected fault signature to determine whether the logged fault signature matches the expected fault signature.

\* \* \* \* \*